March 4, 1952

W. B. McBURNEY 2,588,138

FLY ASH ARRESTER

Filed Sept. 20, 1950

INVENTOR.
WILLARD B. McBURNEY
BY
ATTORNEY

Patented Mar. 4, 1952

2,588,138

UNITED STATES PATENT OFFICE 2,588,138

FLY ASH ARRESTER

Willard B. McBurney, Atlanta, Ga.

Application September 20, 1950, Serial No. 185,769

4 Claims. (Cl. 183—77)

This invention relates to separating solid materials from gases and vapors and more particularly to a fly ash arrester or cinder catcher.

In the past, many devices have been used for separating solids from gases which have employed centrifugal means for throwing the heavier solid material to the periphery of a cylinder and collecting the solids as they drop by gravity. Some of these prior art devices have used blades which rotate in the cylinder to throw the heavier particles to the outside; others have utilized a swirling motion imparted to the gases themselves to separate the entrained solid materials, for example, the induction-type cyclone.

The first class of centrifugal separators mentioned above tend to have fairly high efficiency but the prior art devices tend to warp and buckle when used with gases at high temperatures. Accordingly, it is an object of my invention to provide a device of the blade type centrifugal entrainment separator which will not buckle or warp when hot gases are passed through it.

Another object of the invention is to provide a centrifugal entrainment separator which is inexpensive to manufacture and yet has a very high efficiency.

A further object of the invention is to provide a device for separating entrained solids from gases, which may be easily and inexpensively manufactured and installed, and which is easily accessible for repair.

A further object of the invention is to provide a device embodying the features mentioned and in which the blades of the impeller may be individually installed or replaced.

A further object of the invention is to provide a device of the class mentioned above, in which the shaft supporting the blades is protected from the hot gases and is cooled by circulation of ambient air.

A further object of the invention is to provide a device of the class mentioned above which contains a means for driving the gases through the device, which means is integral with the blades of the separator.

Other and further objects and advantages of my invention will become apparent from the following description taken in conjunction with the accompanying drawing wherein like characters of reference designate corresponding parts throughout the several views, and wherein.

Figures 1, 2, 3:
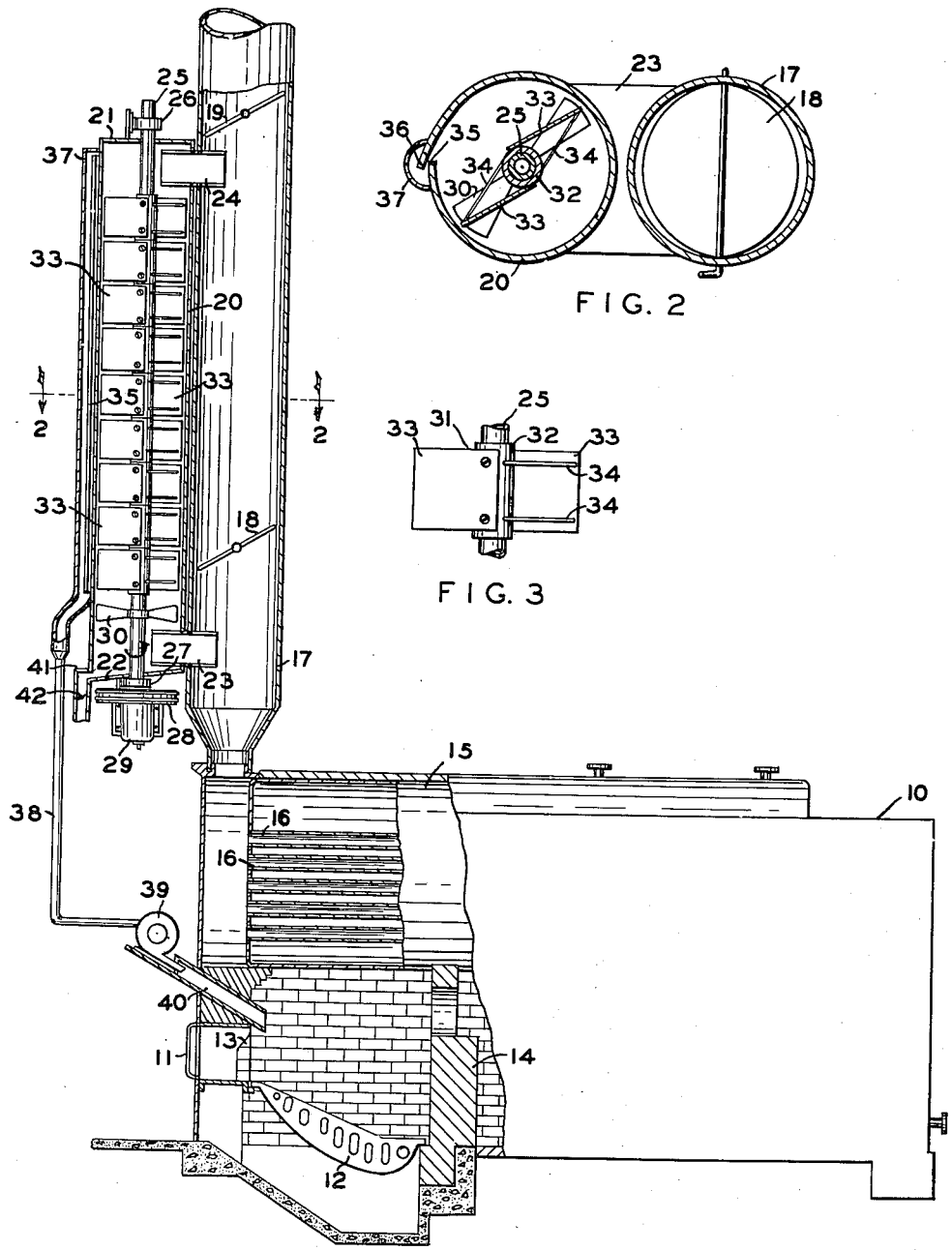
Fig. 1 is a cross-sectional side view of an apparatus for separating solid materials from gases and vapors constructed in accordance with my invention, attached to the stack of a conventional boiler.
Fig. 2 is a cross-sectional view taken along line 2—2 of Fig. 1.
Fig. 3 is a side view of a detail.

Even though I do not wish to limit my invention to the separation of fly ash from stack gases, my invention is particularly well adapted for that use, and in the embodiment chosen for illustration I have shown my invention attached to the stack of a conventional fire tube coal or wood refuse burning boiler. In the drawing, the steam generation plant is designated generally by numeral 10 and contains a furnace door 11, grate 12, side wall 13, fire wall 14, boiler 15, and fire tubes 16, all arranged in the conventional manner. Stack 17 is attached in the conventional way to receive the gases passing out of steam generation plant 10 and contains dampers 18 and 19 arranged within the stack as shown in Fig. 1.

Positioned adjacent and parallel to stack 17 is an upstanding cylindrical shell 20 which is substantially the same diameter as stack 17 and is closed at its top by top plate 21 and at its bottom portion by inclined plate 22. The function of plate 22 will be described more fully hereinafter.

Extending horizontally from the sides of shell 20 at substantially the top and bottom portions respectively thereof are channels 23 and 24 which are of rectangular cross-section and connect shell 20 with the corresponding sections of stack 17 to provide passageways therebetween. As seen in Fig. 1, channel 23 is connected to stack 17 between steam generation plant 10 and damper 18, and channel 24 is connected to stack 17 immediately below damper 19. Therefore, with damper 19 open, by proper adjustment of damper 18 the stack gases may be selectively passed directly out of the stack or be shunted through shell 20.

Positioned axially of shell 20 is a vertical, hollow shaft 25 which extends through appropriate apertures in plates 21 and 22 and is journaled in bearings 26 and 27. Bearings 26 and 27 are fixed to the outer portions of plates 21 and 22, respectively, and thereby center shaft 25 within shell 20. Shaft 25 is made hollow and its ends extended beyond the ends of shell 20 to permit circulation of a cooling fluid, such as ambient air, therethrough.

Adjacent bearing 27 and on the lower end of shaft 25 is pulley 28 which is driven by motor 29, positioned externally of shell 20. As seen in Figs. 1 and 2, a conventional fan 30 is fixed within shell 20 on shaft 25 at a position slightly above channel 23, so that when shaft 25 is rotated a suction is formed at channel 23 which draws gases into shell 20.

Numeral 31 denotes generally impellers which are positioned in stacked parallel relation on shaft 25 above fan 30 and below channel 24. Each impeller 31 consists of a sleeve 32 and a pair of flat rectangular blades 33 which are attached tangentially by one end to the outer periphery of the sleeve so that the blades may extend away from each other as shown in Fig. 3. A pair of braces 34 extend outwardly from the periphery of sleeve 32 which is adjacent the fixed end of each blade 33 and these braces are fixed to the free ends of the opposite blade to provide supports as shown in Figs. 2 and 3. The outer ends of blades 33 extend almost to the wall of shell 20 and are positioned along a diameter of shaft 25, being rigidly held in place by braces 34. Any conventional means such as a set screw or weld may be used to fix each impeller 31 on shaft 25, but it should be remembered that each impeller may easily be replaced by merely removing the impellers above it and installing a new impeller in its place. It should also be remembered that the impeller 31 positioned immediately above fan 30 should be spaced therefrom so that it will not interfere with the function of the fan. The impeller blades are affixed to separate sleeves 32 to permit welding and assembly without warping and to resist warping when subjected to the high temperature of the stack gases.

At a position remote from stack 17, shell 20 is vertically broken so that the break 35 may extend adjacent all impellers 31 and one end portion 36 formed by that break is protruded outwardly to be spaced from and somewhat overlap the other end portion as best seen in Fig. 2. A semi-cylindrically shaped cover 37, closed at its top portion, is fixed on shell 20 to enclose the space formed by break 35. A duct or pipe 38 connects the lower end of cover 37 with the intake of blower 39. Blower 39, through an appropriate opening 40, discharges into the furnace of the steam generation plant 10 at a point adjacent furnace door 11.

At the lower junction of shell 20 and the inclined lower plate 22 is located a hollow pipe 41 which has a clean out valve 42. Pipe 41 acts as a discharge or drain pipe for shell 20 so that when solid materials have collected at the bottom of shell 20, this material will gravitate, because of the slant of plate 22, into the mouth of pipe 41.

From the above detailed description, it will be apparent that the function of my invention is as follows: When fuel is burned in the steam generation plant, smoke and entrained solids enter the bottom of stack 17. If dampers 18 and 19 are open, of course, the smoke will travel up the stack and out, thus bypassing the entrainment separator. Now, let us assume that it is desired to separate the solid material from the stack gases; damper 18 would be closed, motor 29 and blower 39 started, thus activating the entrainment separator. When the entrainment separator is activated, gases pass into the lower section of stack 17, through channel 23 and are driven by fan 30 past the rotating blades of the impellers 31, out through channel 24 into stack 17. The centrifuging action of rotating blades is well known; as the stack gases pass up shell 20, the swirling motion imparted to these gases will throw the heavier solid particles to the wall of shell 20, and these particles will be forced around the wall, through break 35 and into cover 37. The particles then are taken by gravity and the suction of blower 39 and discharged through opening 40 into the furnace of the steam generation plant where the carbon and other combustible solids may be burned. It is apparent that, as viewed in Fig. 2, impellers 31 must rotate in a counter-clockwise direction in order to separate the solid material as described above. Damper 19 has been placed in stack 17 so that by varying the setting of the damper, the pressure within shell 30 may be varied to increase the effectiveness of the entrainment separator.

Under actual tests conducted by consulting engineers it has been found that my invention is more than 99% efficient in separating fly ash from stack gases. It will be obvious to those skilled in the art that I have provided apparatus of great usefulness, and that many variations may be made in the apparatus disclosed in the specification and drawing without departing from the scope of my invention as defined in the appended claims.

I claim:

1. Apparatus of the class described comprising, a stack for receiving products of combustion, upper and lower adjustable means for controlling flow of gases through said stack, a substantially cylindrical shell adjacent said stack, said shell having closed upper and lower ends, inlet means for admitting gases from said stack to said shell, outlet means for returning gases from said shell to said stack, said inlet means being connected to said stack below said lower adjustable means, said outlet means being connected to said stack between said upper and lower adjustable means, a shaft extending axially through said shell and journaled for rotation therein, means for rotating said shaft, a fan mounted on said shaft for rotation therewith to assist the passage of gases from said stack through said shell, impeller blades mounted for rotation with said shaft for imparting a swirling motion to gases in said shell, said shell having a longitudinal split and having a lip flaring outwardly along said split for the passage of ash outwardly through said split, and a cover over said split forming a channel for the passage of ash downwardly beside said shell.

2. Apparatus of the class described comprising, a stack for receiving products of combustion, upper and lower adjustable means for controlling flow of gases through said stack, a substantially cylindrical shell adjacent said stack, said shell having closed upper and lower ends, inlet means for admitting gases from said stack to said shell, outlet means for returning gases from said shell to said stack, said inlet means being connected to said stack below said lower adjustable means, said outlet means being connected to said stack between said upper and lower adjustable means, a shaft extending axially through said shell and journaled for rotation therein, means for rotating said shaft, a fan mounted on said shaft for rotation therewith to assist the passage of gases from said stack through said shell, a plurality of collars fixed to said shaft above said fan, a pair of impeller blades tangentially attached to each of said collars for imparting a swirling motion to gases in said shell, said blades having outer ends arranged substantially on a diameter of said shaft, said shell having a longitudinal split having a lip flaring outwardly for the passage of ash outwardly through said split, and a cover over said split forming a channel for the passage of ash downwardly beside said shell.

3. Apparatus of the class described comprising, a stack for receiving products of combustion, upper and lower adjustable means for controlling flow of gases through said stack, a substantially cylindrical shell adjacent said stack, said shell having closed upper and lower ends, inlet means for admitting gases from said stack to said shell, outlet means for returning gases from said shell to said stack, said inlet means being connected to said stack below said lower adjustable means, said outlet means being connected to said stack between said upper and lower adjustable means, a shaft extending axially through said shell and journaled for rotation therein, said shaft being hollow for the flow of cooling fluid therethrough, means for rotating said shaft, a fan mounted on said shaft for rotation therewith to assist the passage of gases from said stack through said shell, a plurality of collars fixed to said shaft above said fan, a pair of impeller blades tangentially attached to each of said collars for imparting a swirling motion to gases in said shell, said blades having outer ends arranged on a diameter of said shaft, said shell having a longitudinal split substantially throughout its length and having a lip flaring outwardly along said split for the passage of ash outwardly through said split, and a cover over said split forming a channel for the passage of ash downwardly beside said shell.

4. Apparatus of the class described comprising, a stack for receiving products of combustion, upper and lower adjustable means for controlling flow of gases through said stack, a substantially cylindrical shell adjacent said stack, said shell having closed upper and lower ends, inlet means for admitting gases from said stack to said shell, outlet means for returning gases from said shell to said stack, said inlet means being connected to said stack below said lower adjustable means, said outlet means being connected to said stack between said upper and lower adjustable means, a shaft extending axially through said shell and journaled for rotation therein, said shaft having upper and lower ends terminating outside the closed upper and lower ends of said shell, said shaft being hollow for the flow of cooling fluid therethrough, means for rotating said shaft, a fan mounted on said shaft for rotation therewith to assist the passage of gases from said stack through said shell, a plurality of collars fixed to said shaft above said fan, a pair of impeller blades tangentially attached to each of said collars for imparting a swirling motion to gases in said shell, said blades having outer ends arranged on a diameter of said shaft, said shell having a longitudinal split substantially throughout its length and having a lip flaring outwardly along said split for the passage of ash outwardly through said split, and a cover over said split forming a channel for the passage of ash downwardly beside said shell.

WILLARD B. McBURNEY.

REFERENCES CITED

The following references are of record in the file of this patent:

UNITED STATES PATENTS

| Number | Name | Date |
| --- | --- | --- |
| 640,796 | Neuhs | Jan. 4, 1900 |
| 1,035,988 | Miller | Aug. 20, 1912 |
| 1,943,949 | Coghlan et al. | Jan. 16, 1934 |
| 2,024,197 | Bailey et al. | Dec. 17, 1935 |
| 2,453,593 | Putney | Nov. 9, 1948 |

FOREIGN PATENTS

| Number | Country | Date |
| --- | --- | --- |
| 436,850 | Germany | Nov. 10, 1926 |